Patented Aug. 25, 1953

2,650,251

UNITED STATES PATENT OFFICE 2,650,251

BACTERICIDAL COMPOUNDS

James M. Sprague, Drexel Hill, Pa., assignor to Merck & Co., Inc., a corporation of New Jersey No Drawing. Application February 28, 1951, Serial No. 213,301

5 Claims. (Cl. 260—567.6)

This invention relates to antiseptic and germicidal compounds, and more particularly to quaternary ammonium compounds having these properties, and having the general formula:

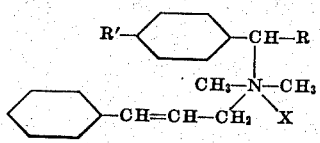

in which R and R' are alkyl radicals, the total number of carbon atoms contained in R and R' being from 11 to 15 inclusive and X is a chloride, iodide or bromide radical.

A feature of the invention resides in the discovery that the presence of the cinnamyl radical in the compounds unexpectedly enhances bactericidal action. Compounds of a somewhat analogous structure have been known, but they have not included the cinnamyl radical of this invention.

Of the compounds of the invention, particularly active are those in which R and R' are both alkyl, of approximately equal chain length, and in which the total of the carbon atoms contained in R+R' is from 11 to 15. [1-(p-2-pentylphenyl)-heptyl]dimethyl-cinnamyl quaternary ammonium halides possess particular utility.

Aqueous solutions of these compounds are valuable as antiseptics and germicides. For example, they may be used as mouth washes and for topical application. Due to the unusually high activity of the compounds very dilute aqueous solutions may be used and they possess the consequent distinct advantage of lacking a strong taste or odor.

The compounds of the invention may be prepared by starting with an appropriate alkyl benzene and introducing the appropriate acyl group by means of the Friedel-Crafts reaction in the para position. The resulting ketone is then transformed, by means of the Leuckart reaction, to the α-amino alkylbenzene containing a para substituent.

These primary amines are converted to the corresponding tertiary amines by dimethylation with formic acid and formaldehyde according to known methods. One such method involves the addition of one mole of the selected amine dropwise to about 5 moles of formic acid (90%) to obtain the formate of the primary amine and then adding rapidly, during about a minute, about 2.2 moles of formaldehyde (36%). This should all take place with the reaction flask immersed in a cool water bath while the mixture is stirred continuously. The mixture is allowed to react without heating for an additional fifteen minutes, then cautiously warmed until a vigorous reaction commences as is evidenced by considerable foaming due to the evolution of carbon dioxide. The reaction is thereafter controlled to maintain gentle refluxing conditions by the application of heat or a cool water bath, as required. The vigorous reaction subsides in about 15 minutes but the stirring should be continued and the flask should be heated on a steam bath for about an additional seven hours.

The tertiary amine is then isolated by conventional methods as follows: The mixture is diluted with water and made strongly alkaline with an excess of sodium or ammonium hydroxide solutions. The oil that separates is dissolved in benzene. The benzene solution is thoroughly washed with water and then benzene is removed by distillation. The tertiary amine is separated from the residue by fractional distillation in vacuum.

The tertiary amine is then quaternized by allowing it to react, preferably at room temperature, with an equimolecular amount of a cinnamyl halide until the resulting solid is completely soluble in water. The quaternary ammonium salt is then purified by crystallization from an appropriate solvent or solvent mixture.

As the tertiary amine, that is, the α-(p-substituted phenyl) alkyldimethylamine, is made readily according to the above procedure or is obtainable commercially, the tertiary amines are employed as starting materials in the following examples.

Example 1—[1-(p-2-pentylphenyl)-heptyl]-dimethyl-cinnamyl-ammonium chloride.—2.9 g. (0.01 mole) [1-(p-2-pentylphenyl)-heptyl]dimethylamine and 1.52 g. (0.01 mole) cinnamyl chloride were mixed together in an Erlenmeyer flask and allowed to stand at room temperature until the reaction product was completely soluble in water. This occurred in approximately 10 days. The reaction product was washed with ether to remove excess cinnamyl chloride, the ether was decanted and the compound dissolved in alcohol and precipitated with benzin. The salt was separated and dried in vacuo. The compound was obtained as a viscous semi-solid and possessed the formula:

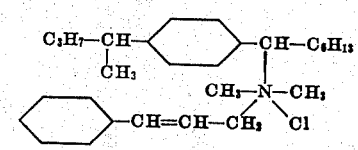

as confirmed by analyses.

*Example 2—[1-(p-2-pentylphenyl)-heptyl]-dimethyl-cinnamyl-ammonium bromide.*—The corresponding bromide was prepared by using an equivalent amount of cinnamyl bromide instead of the cinnamyl chloride used in Example 1.

*Example 3—[1-(p-octylphenyl)-octyl]-dimethyl-cinnamyl-ammonium chloride.*—This compound was prepared as in Example 1 by reacting [1-(p-octylphenyl)-octyl]-dimethylamine 3.45 g. (0.01 mole) and cinnamyl chloride 1.52 g. (0.01 mole). The reaction was completed in approximately 5 days and the product was recrystallized from isopropyl ether. The compound had the formula:

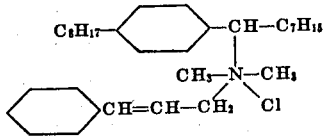

and has a melting point of 100–103° C. (uncorrected).

*Example 4—[1(p-octylphenyl)-octyl]-dimethyl-cinnamyl-ammonium iodide.*—The corresponding iodide was prepared by using an equivalent amount of cinnamyl iodide instead of the cinnamyl chloride used in Example 3.

What is claimed is:
1. Quaternary ammonium compounds of the formula:

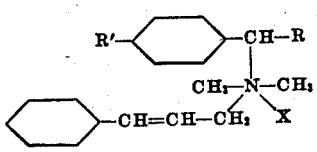

in which R and R' are alkyl radicals of approximately equal chain length, the total number of carbon atoms contained in R and R' being from 11 to 15 inclusive, and X is chosen from the group consisting of chloride, iodide and bromide.

2. [1-(p-2-pentylphenyl) - heptyl] - dimethyl-cinnamyl-ammonium chloride.
3. [1 - (p-octylphenyl)-octyl] - dimethyl-cinnamyl-ammonium chloride.
4. [1-(p - pentylphenyl) - heptyl] - dimethyl-cinnamyl-ammonium bromide.
5. [1-(p - octylphenyl) - octyl]-dimethyl-cinnamyl-ammonium iodide.

JAMES M. SPRAGUE.

References Cited in the file of this patent
UNITED STATES PATENTS

| Number | Name | Date |
|---|---|---|
| 2,276,587 | Mettler et al. | Mar. 17, 1942 |

OTHER REFERENCES

"Chemical Abstracts," vol. 36 (1942), P6662.